F. J. LEITCH.
MEANS FOR SEPARATING SEED PODS OR THE LIKE FROM STALKS OF PLANTS.
APPLICATION FILED NOV. 20, 1918.
1,309,207.
Patented July 8, 1919.
5 SHEETS—SHEET 5.
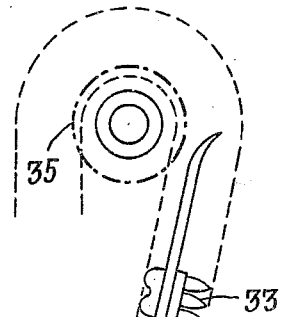
FIG. 7.
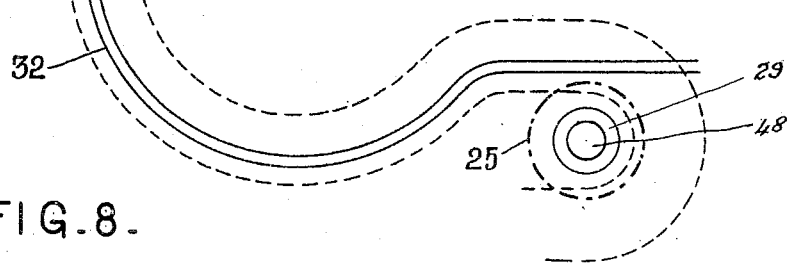
FIG. 8.
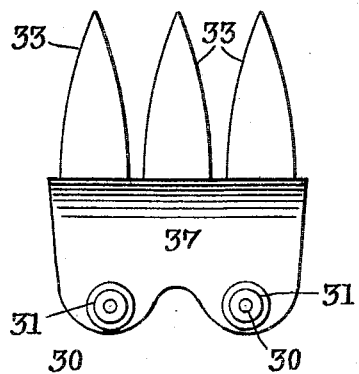
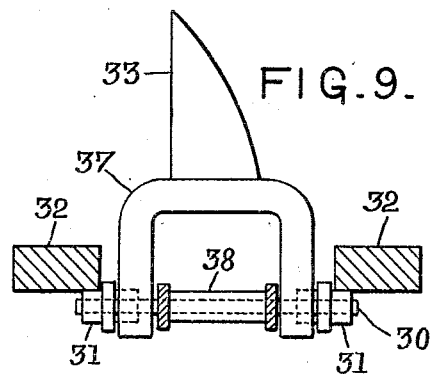
FIG. 9.
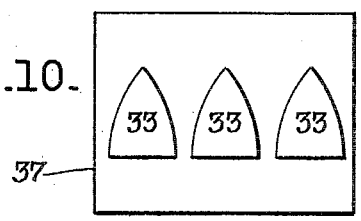
FIG. 10.
Inventor
Frederick J. Leitch
by Herbert W. Jenner
Attorney

UNITED STATES PATENT OFFICE.

FREDERICK JOHNSTON LEITCH, OF BELFAST, IRELAND.

MEANS FOR SEPARATING SEED-PODS OR THE LIKE FROM STALKS OF PLANTS.

1,309,207. Specification of Letters Patent. Patented July 8, 1919.

Application filed November 20, 1918. Serial No. 263,292.

*To all whom it may concern:*

Be it known that I, FREDERICK JOHNSTON LEITCH, a subject of the King of Great Britain, residing at Belfast, Ireland, have invented certain new and useful Improvements in Means for Separating Seed-Pods or the like from Stalks of Plants, of which the following is a specification.

The subject of this invention is an apparatus which is particularly intended for separating the seed capsules or bolls from the stalks of the flax plant, but may be found applicable for de-seeding other plants, such as oats or other grain crops.

The basis of my invention is that the flax carrier and the teeth or operative elements of the stripping device, which are so arranged as to have a combing instead of a beating action, shall at the position of engagement be traveling in curved paths in different planes inclined in relation to one another, the curves of the respective paths being practically tangential, so that immediately after the flax or other plant has been engaged by the stripping device, the simultaneously engaging portions of the said device and of the carrier begin to diverge at a gradually accelerated rate, and the stalks will thus be combed longitudinally toward their tips, until after the removal of the seed pods the said stalks are released.

In giving practical effect to this principle, I employ a rotary cylindrical carrier driven by hand or power and in contact over a considerable portion of its circumference (say one fourth, one third, or even half) with a leather or other suitable belt or belts, between which and the cylinder the plant stalks are firmly held and carried around the said portion of the cylinder's circumference. Immediately after their entry between the cylinder and belts the stalks are engaged by combing teeth actuated by a crown wheel or other toothed wheel; that is, in the case of a crown wheel the teeth are on the wheel itself, and in the case of a sprocket wheel the teeth are on a chain passing around the wheel, such teeth in either case being themselves inclined in relation to the path of the stalks. The stalks enter between these teeth, to a sufficient extent to insure engagement of all the seed pods, and as the belts and teeth mutually recede the seed capsules are stripped off each individual stalk one after another, thus avoiding undue strain upon the fibers of the stalk. The stripped stalks are then carried around the cylinder and delivered at the point where the belt or belts pass out of contact with the cylinder. A single row or file of teeth engaging the ends of the plants from one side only will be sufficient to produce this combing action.

Fig. 7 is an elevation on a smaller scale of a guide bar taken in the direction of the arrow VII in Fig. 6.

Fig. 8 is a side elevation on a larger scale of one of the toothed members, in the sprocket chain shown in Fig. 6. Fig. 9 is an end elevation of the said member with adjacent parts shown partly in section.

Fig. 10 is a plan of the said member.

Figure 1:
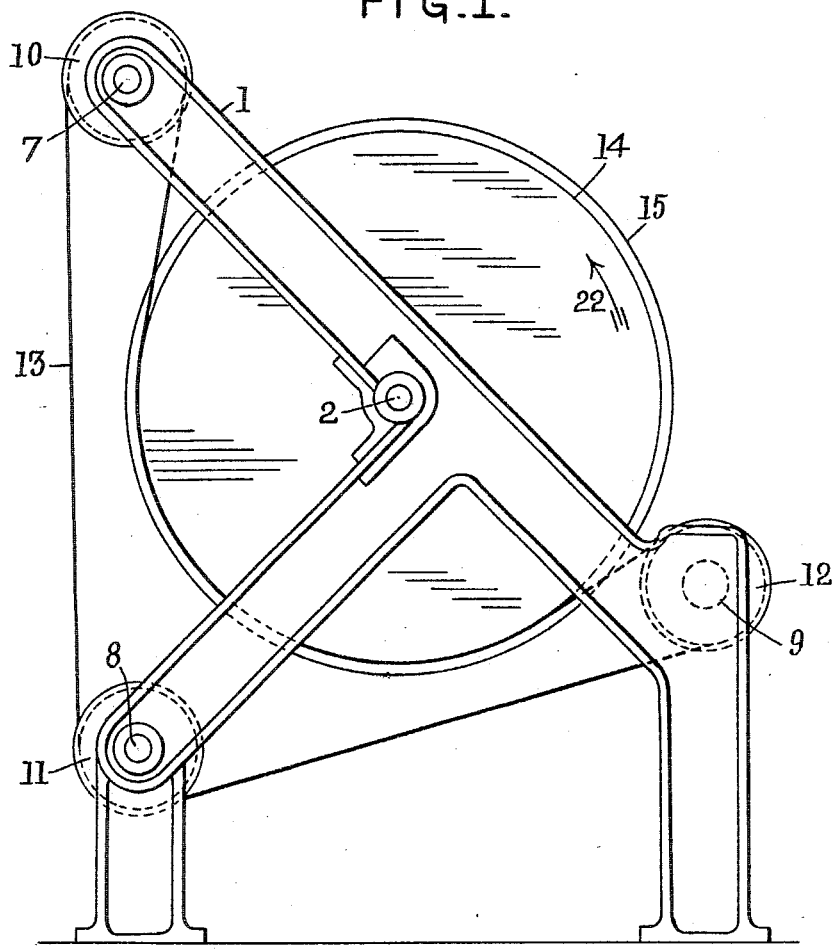
Figure 1 is a front end elevation of a machine constructed according to this invention.
Figure 2:
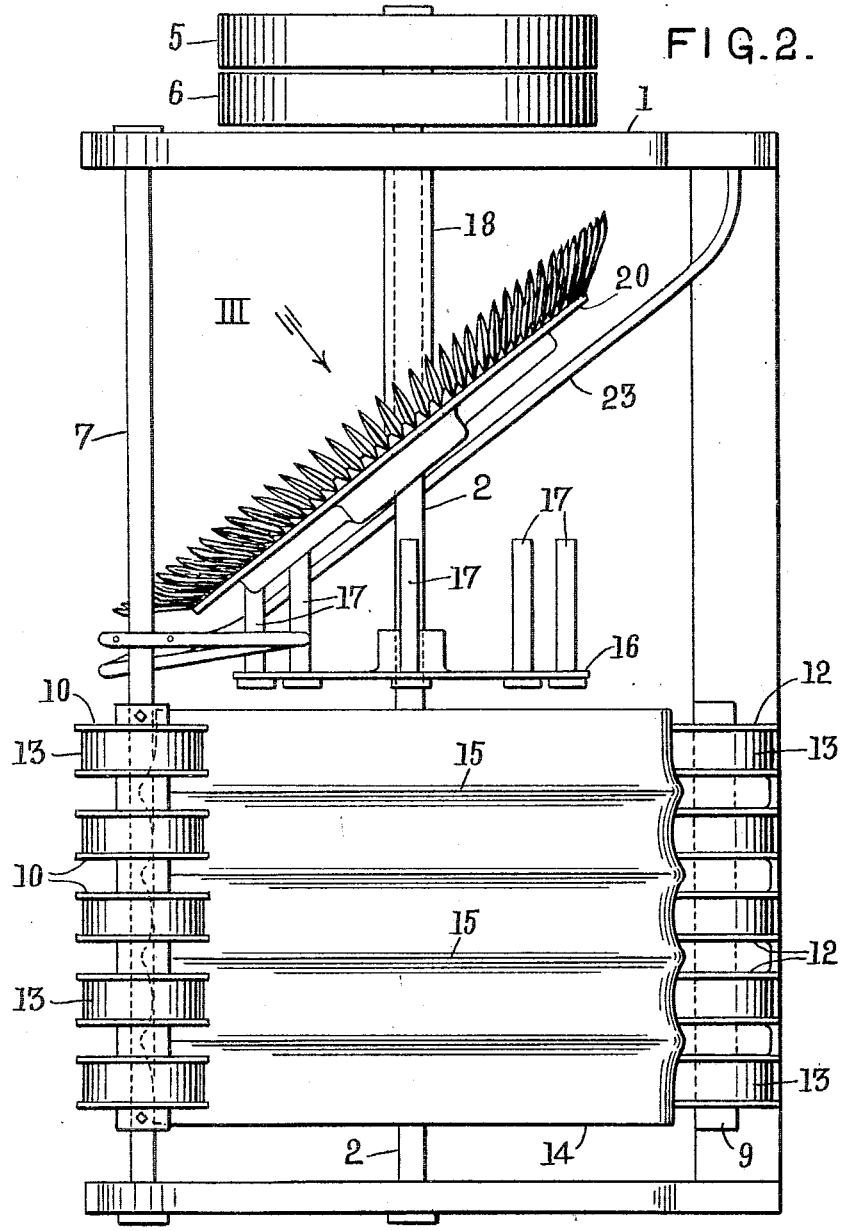
Fig. 2 is a plan of the machine shown in Fig. 1.
Figure 3:
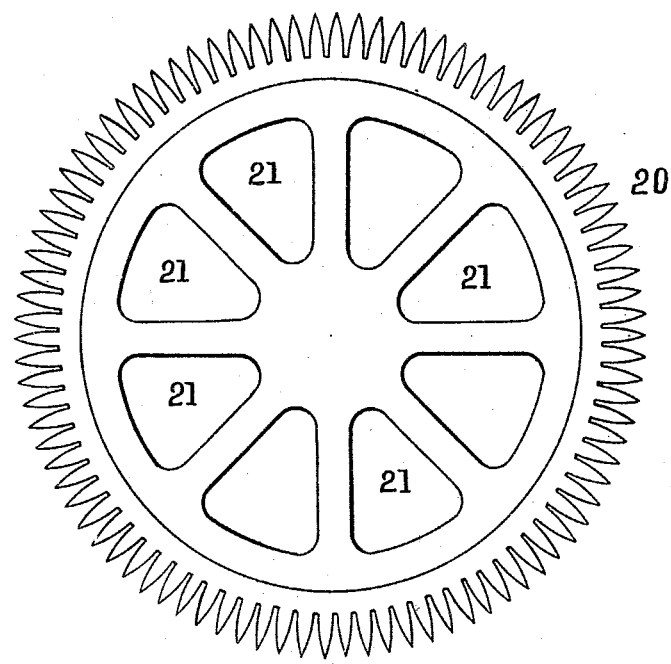
Fig. 3 is a view of the crown wheel detached, taken in the direction of the arrow III in Fig. 2.
Figure 4:
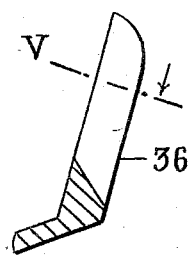
Fig. 4 is a side elevation on a larger scale of a tooth of the crown wheel.
Figure 5:
Fig. 5 is a section of the said tooth taken on the line V in Fig. 4.

Referring firstly to Figs. 1 and 2, the reference numeral 1 indicates the framework of the machine, 2 the main shaft driven either manually by means of any suitable handle, or from any convenient source of power by means of a belt (not shown) engaging one of a pair of pulleys 5, 6, the other pulley being a loose pulley as usual. On countershafts 7, 8 and 9 are mounted a series of belt pulleys 10, 11, 12, over which pass a series of belts 13. On the shaft 2 is secured a cylinder 14 having ridges or corrugations 15, in the depressions between which the belts 13 work, so that each stalk is bent over each ridge, and into the intervening depressions, in order to insure a good grip of the stalks. On the same shaft is secured a plate 16 from which project pegs 17. On a sleeve or bearing 18 is mounted a toothed crown wheel 20 having openings 21 (Fig. 3) the edges of which openings are adapted to be engaged successively by one or other of the pegs 17, whereby when the machine is in action the wheel 20 is caused to rotate in a vertical plane, but at an angle horizontally of 45 degrees, or more or less, with the plane of the rotation of the cylinder 14, the pegs successively disengaging themselves from the openings in the wheel as the rotation of the wheel takes any one of such openings away from the path of the driving pegs. The teeth of the crown wheel are of the shape shown in Figs. 4 and 5, each tooth having a blunt knife edge at 36 on its outer aspect, so that the stalks will fall or be guided into the spaces between the teeth and the seed pods will be successively held against the flat inner sides of the teeth and detached as the stalks are drawn through the said spaces.

The seed-bearing stalks are laid on the top of the cylinder in such a position that as the cylinder rotates in the direction of the arrow 22 (Fig. 1) the seed pods will be led in between the teeth of the wheel 20, which will gently detach them one after another from each stalk as the said teeth pass further away from the cylinder, the seeds detached then dropping from the wheel into any suitable receptacle placed below the wheel, while the stripped stalks are carried under the cylinder and delivered by the belts 13 over the pulleys 12. The bent rod or wire 23 guides the head ends of the stalks and prevents them from whipping or flicking past the teeth of the wheel without being combed thereby.

Figure 6:
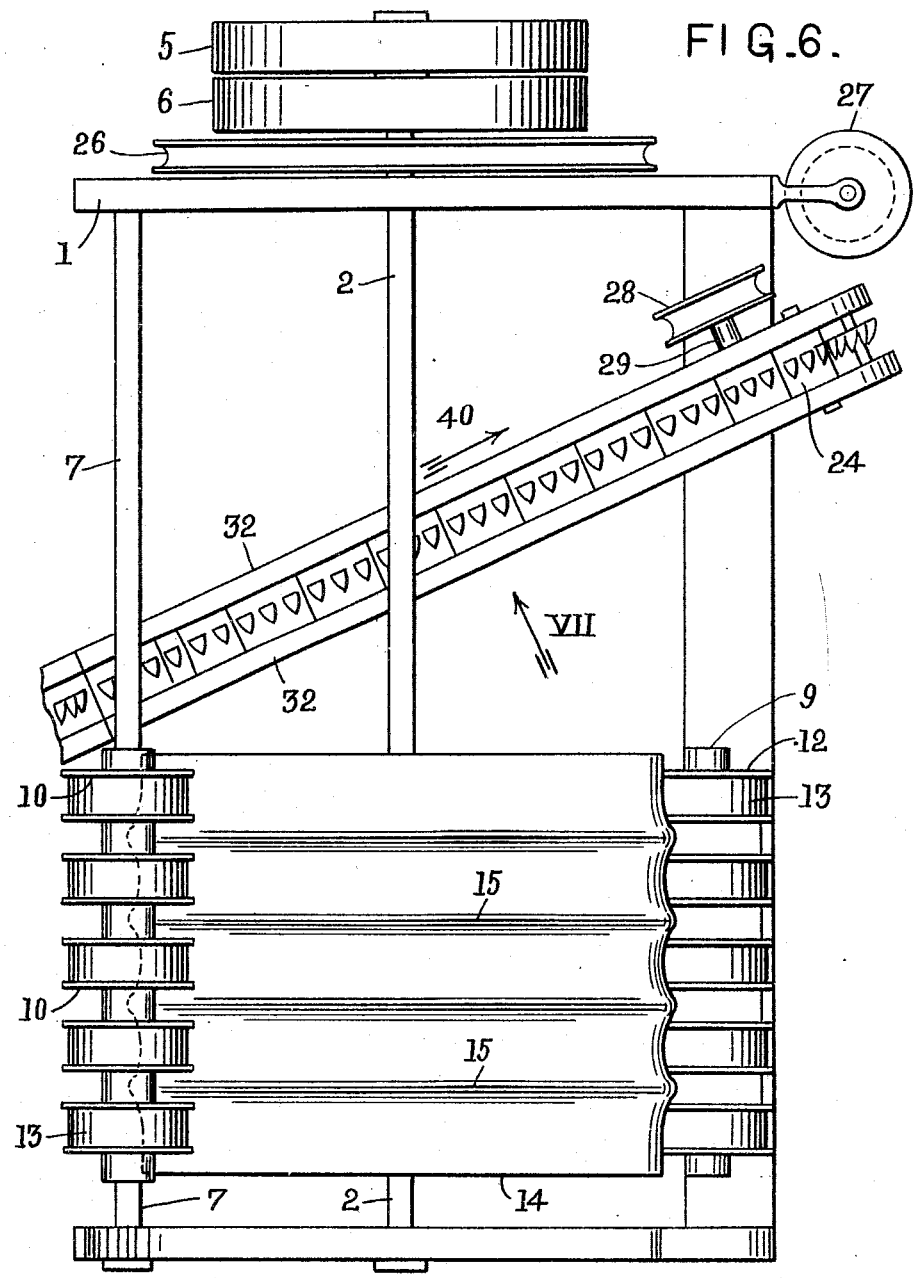
Fig. 6 is a plan of a machine having a different arrangement of traveling teeth.

Referring now to Figs. 6 to 10, the action of the cylinder 14 and belts 13 is exactly the same as described with reference to Figs. 1 and 2, but the crown wheel and driving plate are replaced by a toothed chain indicated generally at 24 in Fig. 6 driven by a sprocket wheel indicated in dotted lines at 25 in Fig. 7. In this modification the teeth at the moment of their engagement with the stalks are traveling in a plane inclined to the vertical and which is also horizontally divergent in relation to the plane of the rotation of the cylinder.

A band pulley 26 on the main shaft drives, through the intervention of a carrier pulley 27, a pulley 28 on the shaft 48 of the sprocket wheel 25 which stud works in a bearing 29. Each link of the chain is provided with two crossbars 30 carrying antifriction rolls 31 which during the operative travel of the chain run in contact with guide bars 32 suitably secured in the machine, and on members 37 of the chain are carried teeth 33 which project between and above the said guide bars, in such a manner as to draw the seed pods away from the stalks which are held between the cylinder 14 and belts 13, the combing action of these teeth being the same as described with reference to the crown wheel represented in Figs. 2 and 3. The links proper of the chain comprise bushings or sleeves 38 (Fig. 9) through which bushings and through the members 37 the aforesaid crossbars 30 are passed in assembling the chain, the said bushings 38 being engaged by the teeth of the sprocket wheel when in action. The return portion of the chain 24 travels over a carrier sprocket wheel (not shown) on the lower shaft 8 (Fig. 1) and thence over another carrier sprocket wheel 35 (indicated by dotted lines in Fig. 7), on the upper shaft 7, the two latter sprocket wheels having skew bosses or bushings. The direction of travel of the sprocket chain is immaterial, but is preferably that indicated by the arrow 40 in Fig. 6; this can be reversed by manipulating the band between pulleys 26 and 28.

In the form of the device shown in Figs. 1 and 2, all the stripping teeth of the crown wheel 20 are movable in a path substantially concentric with the feeding cylinder, the curved portion of the said crown wheel being circular. In the form of the device shown in Figs. 6 and 7 the curved portion of the stripping device which carries the stripping teeth 33 is also substantially concentric with the feeding cylinder, but this curved portion only extends for a portion of a circle, and not for a whole circle like the curved portion of the stripping device shown in Figs. 1 and 2.

I claim as my invention:—

1. In a stripping machine, a feeding cylinder provided with means for holding the plants, a toothed stripping device arranged diagonally of the axis of the said cylinder at one end thereof, said stripping device being provided with a curved portion having teeth arranged substantially concentric with the said cylinder and operating to strip the plants, and means for driving the said cylinder and stripping device in the same general direction.

2. In a stripping machine, a feeding cylinder provided with means for holding the plants, a toothed stripping wheel arranged substantially concentric with the said cylinder and diagonally of its axis, and means for revolving the said cylinder and stripping device in the same general direction.

3. In a stripping machine, a feeding cylinder provided with circumferential corrugations and having means for holding the plants against the said corrugations, a toothed stripping device arranged diagonally of the axis of the said cylinder at one end thereof, said stripping device being provided with a curved portion having teeth arranged substantially concentric with the said cylinder and operating to strip the plants, and means for driving the said cylinder and stripping device in the same general direction.

4. In a stripping machine, a feeding cylinder provided with circumferential corrugations, flexible bands arranged around the cylinder opposite the grooves of its corrugations and operating to hold the plants against them, a toothed stripping device arranged diagonally of the axis of the said cylinder at one end thereof, said stripping device being provided with a curved portion having teeth arranged substantially concentric with the said cylinder and operating to strip the plants, and means for driving the said cylinder and stripping device in the same general direction.

5. In a stripping machine, a revoluble feeding cylinder provided with means for holding the plants, a toothed stripping wheel arranged substantially concentric with the said cylinder and diagonally of its axis, and driving bars or pegs arranged around the axis of the said cylinder and revolving with it and engaging with the said stripping wheel one after another.

6. In a stripping machine, a revoluble feeding cylinder provided with means for holding the plants, a driving shaft for the said cylinder, a toothed stripping wheel provided with a hub which is mounted on the said shaft, said stripping wheel being arranged substantially concentric with the cylinder and diagonally of the said shaft, and driving bars or pegs arranged around the said shaft and revolving with it and engaging with the stripping wheel one after another.

In testimony whereof I affix my signature in the presence of two witnesses.

FREDERICK JOHNSTON LEITCH.

Witnesses:
 RUBY E. MANN,
 GEORGE BOYLE HANNA.

Copies of this patent may be obtained for five cents each, by addressing the "Commissioner of Patents, Washington, D. C."